United States Patent
Elmali et al.

(10) Patent No.: US 12,520,371 B2
(45) Date of Patent: Jan. 6, 2026

(54) MULTICAST AND BROADCAST SERVICES IN CELLULAR COMMUNICATION NETWORKS

(71) Applicant: NOKIA TECHNOLOGIES OY, Espoo (FI)

(72) Inventors: Ugur Baran Elmali, Munich (DE); Bighnaraj Panigrahi, Bangalore (IN); Philippe Godin, Massy (FR); Esa Mikael Malkamäki, Espoo (FI); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/928,669

(22) Filed: Oct. 28, 2024

(65) Prior Publication Data
US 2025/0056651 A1    Feb. 13, 2025

Related U.S. Application Data

(63) Continuation of application No. PCT/IB2023/058235, filed on Aug. 16, 2023.

(30) Foreign Application Priority Data

Sep. 29, 2022    (IN) .............................. 202241055992

(51) Int. Cl.
*H04W 76/27* (2018.01)
*H04W 72/30* (2023.01)

(52) U.S. Cl.
CPC ........... *H04W 76/27* (2018.02); *H04W 72/30* (2023.01)

(58) Field of Classification Search
CPC .............................. H04W 76/27; H04W 72/30
See application file for complete search history.

(56) References Cited

U.S. PATENT DOCUMENTS

| | | | |
|---|---|---|---|
| 2007/0197235 A1* | 8/2007 | Zhang | H04L 12/189 455/466 |
| 2009/0270026 A1* | 10/2009 | Shin | H04W 52/0254 455/3.01 |

(Continued)

FOREIGN PATENT DOCUMENTS

| | | |
|---|---|---|
| WO | 2022/002830 A1 | 1/2022 |
| WO | 2022/086109 A1 | 4/2022 |
| WO | 2022/126359 A1 | 6/2022 |

OTHER PUBLICATIONS

International Search Report and Written Opinion dated Oct. 31, 2023 corresponding to International Patent Application No. PCT/IB2023/058235.

(Continued)

*Primary Examiner* — Parth Patel
(74) *Attorney, Agent, or Firm* — SQUIRE PATTON BOGGS (US) LLP

(57) ABSTRACT

According to an example aspect of the present invention, there is provided a method comprising receiving, by an apparatus, a message while the apparatus is in a radio resource control inactive state, wherein the message comprises a first indication indicating a multicast-broadcast service session to which the apparatus has joined and a second indication indicating to remain in the radio resource control inactive state and in response to receiving the message: in case determining based at least on information received in a radio resource control message that the apparatus belongs to a subset of user equipments, initiating a resumption of a radio resource control connection, and in case not determining that the apparatus belongs to the subset, remaining in the radio resource control inactive state.

16 Claims, 7 Drawing Sheets

(56) References Cited

U.S. PATENT DOCUMENTS

| | | | |
|---|---|---|---|
| 2014/0179320 A1* | 6/2014 | Jang | H04W 36/302 |
| | | | 455/436 |
| 2018/0124636 A1* | 5/2018 | Ly | H04L 5/0044 |
| 2018/0167910 A1* | 6/2018 | Zeng | H04L 5/0098 |
| 2019/0223250 A1* | 7/2019 | Dao | H04W 72/23 |
| 2021/0022063 A1* | 1/2021 | Yang | H04W 40/02 |
| 2021/0168569 A1* | 6/2021 | Ayaz | H04W 4/06 |
| 2021/0274515 A1* | 9/2021 | Lei | H04W 72/0446 |
| 2021/0368427 A1* | 11/2021 | Rommer | H04W 48/16 |
| 2022/0015063 A1* | 1/2022 | Byun | H04W 76/40 |
| 2022/0046582 A1* | 2/2022 | Shrivastava | H04W 68/005 |
| 2022/0046594 A1* | 2/2022 | Lee | H04L 5/0094 |
| 2022/0053455 A1* | 2/2022 | Baek | H04W 72/30 |
| 2022/0217560 A1* | 7/2022 | Kumar | H04W 24/10 |
| 2022/0217679 A1* | 7/2022 | Zhao | H04W 4/70 |
| 2022/0225057 A1* | 7/2022 | Godin | H04W 48/16 |
| 2022/0330156 A1* | 10/2022 | Zhou | H04W 72/23 |
| 2023/0361923 A1* | 11/2023 | Wang | H04L 1/1607 |
| 2023/0380002 A1* | 11/2023 | Hong | H04W 68/005 |
| 2024/0381388 A1* | 11/2024 | Zheng | H04W 72/20 |
| 2025/0150365 A1* | 5/2025 | Li | H04W 24/10 |

OTHER PUBLICATIONS

3GPP TS 38.304 V17.1.0 (Jun. 2022), Technical Specification, 3rd Generation Partnership Project; Technical Specification Group Radio Access Network; NR; User Equipment (UE) procedures in Idle mode and RRC Inactive state (Release 17), Jun. 2022.

* cited by examiner

710 — Receiving by an apparatus, a message while the apparatus is in a radio resource control inactive state, wherein the message comprises a first indication indicating a multicast-broadcast service session to which the apparatus has joined and a second indication indicating to remain in the radio resource control inactive state 720 — In response to receiving the message: in case determining by the apparatus based at least on information received in a radio resource control message that the apparatus belongs to a subset of user equipments, initiating a resumption of a radio resource control connection, and in case not determining by the apparatus that the apparatus belongs to the subset, remaining in the radio resource control inactive state

MULTICAST AND BROADCAST SERVICES IN CELLULAR COMMUNICATION NETWORKS

CROSS-REFERENCE TO RELATED APPLICATION

This application is a Continuation of International Patent Application No. PCT/IB2023/058235 filed Aug. 16, 2023, and which claims priority from India Provisional Patent Application No. 202241055992, filed Sep. 29, 2022. The contents of these applications are hereby incorporated by reference.

FIELD

Various example embodiments relate in general to cellular communication networks and more specifically, to multicast and broadcast services in such networks.

BACKGROUND

A multicast transmission refers to a transmission from one transmitting wireless device, such as a wireless network node, to some other wireless devices, such as User Equipments, UEs. However, a multicast transmission is not transmitted to all devices within the coverage area of the transmitting wireless device. A broadcast transmission on the other hand refers to a transmission from one transmitting wireless device to all devices within the coverage area of the transmitting wireless device.

Multicast and Broadcast Services, MBSs, may be provided in various cellular communication networks, such as in cellular communication networks operating according to 5G radio access technology. 5G radio access technology may also be referred to as new radio, NR, access technology. 3rd generation partnership project, 3GPP, develops standards for 5G/NR and some topics in the 3GPP discussions are related to MBS. According to the discussions there is a need to provide improved methods, apparatuses and computer programs related to the use of MBS. Such improvements may be exploited in other cellular communication networks as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus comprising at least one processing core, at least one memory including computer program code, the at least one memory and the computer program code being configured to, with the at least one processing core, cause the apparatus at least to receive a message while the apparatus is in a radio resource control inactive state, wherein the message comprises a first indication indicating a multicast-broadcast service session to which the apparatus has joined and a second indication indicating to remain in the radio resource control inactive state and in response to receiving the message: in case determining based at least on information received in a radio resource control message that the apparatus belongs to a subset of user equipments, initiating a resumption of a radio resource control connection, and in case not determining that the apparatus belongs to the subset, remaining in the radio resource control inactive state. The apparatus of the first aspect may be a user equipment or a control device configured to control the functioning thereof, possibly when installed therein.

Example embodiments of the first aspect may comprise at least one feature from the following bulleted list or any combination of the following features:

- wherein the subset of user equipments comprises privileged user equipments;
- wherein the at least one memory and the computer program code are further configured to, with the at least one processing core, cause the apparatus at least to receive the radio resource control message, wherein the radio resource control message comprises a configuration indicating that the apparatus belongs to the subset of user equipments;
- wherein the at least one memory and the computer program code are further configured to, with the at least one processing core, cause the apparatus at least to receive a paging message during a paging occasion and determine that the apparatus belongs to the subset when the paging occasion is a paging occasion of the subset of user equipments;
- wherein the at least one memory and the computer program code are further configured to, with the at least one processing core, cause the apparatus at least to determine that the apparatus belongs to the subset when the apparatus is configured as a privileged user equipment;
- wherein the message further comprises an indication indicating whether user equipments belonging to the subset are to initiate said resumption of the radio resource control connection responsive to reception of the message;
- wherein the at least one memory and the computer program code are further configured to, with the at least one processing core, cause the apparatus at least to determine that the apparatus is to initiate said resumption of the radio resource control connection based on a parameter representing a percentage or fraction of user equipments in the subset that are to initiate said resumption of the radio resource control connection;
- wherein the at least one memory and the computer program code are further configured to, with the at least one processing core, cause the apparatus at least to receive the parameter in a broadcast message or a paging message;
- wherein the at least one memory and the computer program code are further configured to, with the at least one processing core, cause the apparatus at least to ignore the second indication in case it is determined that the apparatus belongs to the subset of user equipments;
- wherein the at least one memory and the computer program code are further configured to, with the at least one processing core, cause the apparatus at least to start a timer when the apparatus is moved to the radio resource control inactive state and determine that the apparatus belongs to a subset of user equipments when the timer is running;

wherein the radio resource control message is a radio resource control release, reconfiguration or setup message;

wherein the apparatus is a user equipment or a control device configured to control functioning of the user equipment.

According to a second aspect of the present invention, there is provided an apparatus comprising at least one processing core, at least one memory including computer program code, the at least one memory and the computer program code being configured to, with the at least one processing core, cause the apparatus at least to transmit a message to at least one user equipment while the at least one user equipment is in a radio resource control inactive state, wherein the message comprises a first indication indicating a multicast-broadcast service session to which the at least one user equipment has joined and a second indication indicating to remain in the radio resource control inactive state and transmit to a neighbour wireless network node an indication indicating a subset of user equipments, wherein the user equipments in the subset are to initiate a resumption of a radio resource control connection responsive to receiving the message. The apparatus of the second aspect may be a wireless network node or a control device configured to control the functioning thereof, possibly when installed therein.

Example embodiments of the second aspect may comprise the following feature:

wherein the indication is transmitted to the neighbour wireless network when releasing the at least one user equipment to the radio resource control inactive state or when performing radio access network paging.

According to a third aspect of the present invention, there is provided a first method, comprising receiving, by an apparatus, a message while the apparatus is in a radio resource control inactive state, wherein the message comprises a first indication indicating a multicast-broadcast service session to which the apparatus has joined and a second indication indicating to remain in the radio resource control inactive state and in response to receiving the message: in case determining by the apparatus based at least on information received in a radio resource control message that the apparatus belongs to a subset of user equipments, initiating a resumption of a radio resource control connection, and in case not determining by the apparatus that the apparatus belongs to the subset, remaining in the radio resource control inactive state. The first method may be performed by a user equipment or a control device configured to control the functioning thereof, possibly when installed therein.

According to a fourth aspect of the present invention, there is provided a second method, comprising transmitting, by an apparatus, a message to at least one user equipment while the at least one user equipment is in a radio resource control inactive state, wherein the message comprises a first indication indicating a multicast-broadcast service session to which the at least one user equipment has joined and a second indication indicating to remain in the radio resource control inactive state and transmitting, by the apparatus, to a neighbour wireless network node an indication indicating a subset of user equipments, wherein the user equipments in the subset are to initiate a resumption of a radio resource control connection responsive to receiving the message. The second method may be performed by a wireless network node or a control device configured to control the functioning thereof, possibly when installed therein, or a control device configured to control the functioning thereof, possibly when installed therein.

According to a fifth aspect of the present invention, there is provided an apparatus, comprising means for receiving a message while the apparatus is in a radio resource control inactive state, wherein the message comprises a first indication indicating a multicast-broadcast service session to which the apparatus has joined and a second indication indicating to remain in the radio resource control inactive state and in response to receiving the message: in case determining based at least on information received in a radio resource control message that the apparatus belongs to a subset of user equipments, means for initiating a resumption of a radio resource control connection, and in case not determining that the apparatus belongs to the subset, means for remaining in the radio resource control inactive state. The apparatus of the fifth aspect may be a user equipment or a control device configured to control the functioning thereof, possibly when installed therein.

According to a sixth aspect of the present invention, there is provided an apparatus, comprising means for transmitting a message to at least one user equipment while the at least one user equipment is in a radio resource control inactive state, wherein the message comprises a first indication indicating a multicast-broadcast service session to which the at least one user equipment has joined and a second indication indicating to remain in the radio resource control inactive state and means for transmitting to a neighbour wireless network node an indication indicating a subset of user equipments, wherein the user equipments in the subset are to initiate a resumption of a radio resource control connection responsive to receiving the message. The apparatus of the sixth aspect may be a wireless network node or a control device configured to control the functioning thereof, possibly when installed therein.

According to a seventh aspect of the present invention, there is provided a non-transitory computer readable medium having stored thereon a set of computer readable instructions that, when executed by at least one processor, cause an apparatus to at least perform the first or the second method. According to an eighth aspect of the present invention, there is provided a computer program comprising instructions which, when the program is executed by an apparatus, cause the apparatus to carry out the first or the second method.

BRIEF DESCRIPTION OF THE DRAWINGS

FIG. 7 illustrates a flow graph of a first method in accordance with at least some example embodiments.

EXAMPLE EMBODIMENTS

Figure 1:
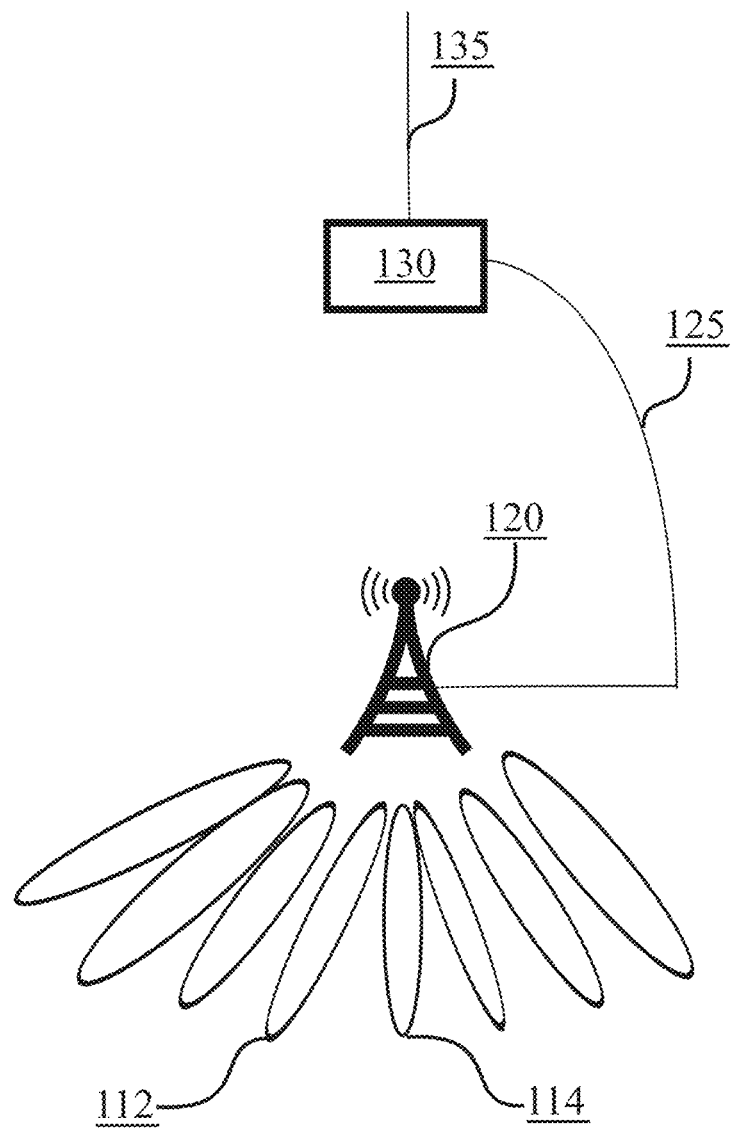
FIG. 1 illustrates an example of a network scenario in accordance with at least some example embodiments.

FIG. 1 illustrates an example of a network scenario in accordance with at least some example embodiments.

According to the example scenario of FIG. 1, there may be a beam-based wireless communication system, which comprises UE 110, wireless network node 120 and core network element 130. UE 110 may be connected to wireless network node 120 via air interface using beams 112 and 114, either simultaneously or one at a time.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. In the example system of FIG. 1, UE 110 may communicate wirelessly with wireless network node 120 for example via beam 112 and/or beam 114. Wireless network node 120 may be considered as a serving node for UE 110 and one cell of wireless network node 120 may be a serving cell for UE 110.

Air interface between UE 110 and wireless network node 120 may be configured in accordance with a Radio Access Technology, RAT, which both UE 110 and wireless network node 120 are configured to support. Examples of cellular RATs include Long Term Evolution, LTE, New Radio, NR, which may also be known as fifth generation, 5G, radio access technology and MulteFire.

For example in the context of LTE, wireless network node 120 may be referred to as eNB while wireless network node 120 may be referred to as gNB in the context of NR. In some example embodiments, wireless network node 120 may be referred to as a Transmission and Reception Point, TRP, or control multiple TRPs that may be co-located or non-co-located. In any case, example embodiments of the present disclosure are not restricted to any particular wireless technology. Instead, example embodiments may be exploited in any wireless communication system, wherein Multicast and Broadcast Service, MBS, or some other similar feature, is used.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

Paging may be used to allow a network, e.g., wireless network node 120, to reach UEs, such as UE 110, in RRC_IDLE and in RRC_INACTIVE states through paging messages. Alternatively, or in addition, paging may be used to notify UEs in RRC_IDLE, RRC_INACTIVE and RRC_CONNECTED states of a change in system information. In some example embodiments, paging messages may be addressed with Paging Radio Network Temporary Identifier, P-RNTI, on a Physical Downlink Control Channel, PDCCH, transmitted on Paging Control Channel, PCCH. Even though RRC_IDLE, RRC_INACTIVE and RRC_CONNECTED states are used as examples in this disclosure, such states may refer in general to any similar radio resource control idle, radio resource control inactive and radio resource connected states, respectively.

UE 110 may for example monitor paging channels for Core Network, CN, —initiated paging while UE 110 is in the RRC_IDLE state. Said CN-initiated paging may comprise an identity of UE 110 in a paging message. In RRC_INACTIVE state, UE 110 may monitor paging channels for Radio Access Network, RAN, —initiated paging. Said RAN-initiated paging may comprise an Inactive Radio Network Temporary Identifier, I-RNTI. The I-RNTI may be configured by a RAN node, like wireless network node 120, that sent UE 110 to the RRC_INACTIVE state.

In some example embodiments of the present disclosure, UE 110 may monitor paging occasions as specified in 3GGP TS 38.304 to receive paging messages. Upon reception of a paging message, UE 110 in RRC_IDLE state may initiate a RRC connection. Upon reception of a paging message in RRC_INACTIVE state, if an identity of UE 110, like a 5G Serving Temporary Mobile Subscriber Identity, 5G-S-TMSI ID, is not indicated in the paging message, UE 110 may initiate a resumption of the RRC connections. In case 5G-S-TMSI ID of UE 110 is indicated in the paging message that is received by UE 110 in RRC_INACTIVE state, UE 110 may move to RRC_IDLE state.

Concerning MBS, Point to Multi-Point, PTM, transmission may be exploited to provision MBS services to multiple users, e.g., by using a same radio framework as for unicast transmissions. One important issue related to the use of MBS in 3GPP networks would be to enable reception of multicast services by UEs in RRC_INACTIVE state for scalability and power saving purposes. Support for and enhancement related to end-to-end MBS traffic delivery for a large number of UEs should be enabled, e.g., by enabling receiving MBS Session data in RRC Inactive state. Also, support of multicast reception by UEs in RRC_INACTIVE state should be specified and PTM configuration for UEs receiving multicast in RRC_INACTIVE state. If for example UE 110 is in RRC_INACTIVE state, it should be able to apply the configuration of the multicast service in the cell to start/continue receiving a multicast service the UE has joined.

Wireless network node 120 may move UE 110 to RRC_I-NACTIVE state if there is no data to be sent to UE 110 for an active multicast session. When an MBS multicast session is deactivated, wireless network node 120 may move UE 110 to RRC IDLE or RRC_INACTIVE state. Wireless network nodes supporting MBS may use a group notification mechanism to notify the UEs in RRC_IDLE or RRC_INACTIVE state when a multicast session has been activated by core network 130 or wireless network node 120 has multicast session data to deliver. Upon reception of the group notification, the UEs reconnect to the network. The group notification may be addressed with P-RNTI on PDCCH. Paging message for group notification may comprise an identity of the MBS session, like a TMGI, that identifies a specific multicast service. The identity of the MBS session may be utilized to page all UEs in RRC_IDLE and RRC_INACTIVE states that joined the associated MBS multicast session. That is, UEs might not be paged individually. A UE may stop monitoring for group notifications related to a specific multicast session once it leaves the associated multicast session.

If a UE in RRC IDLE state that joined an MBS multicast session is camping on a wireless network node that does not support MBS, the UE may be notified about activation of a multicast session or data availability by CN-initiated paging, wherein core network 130 may page each UE individually. On the other hand, if a UE in RRC_INACTIVE state that joined MBS multicast session is camping on a wireless network node that does not support MBS, the UE may be notified about data availability individually by RAN-initiated paging.

In some example embodiments, wireless network node 120 may decide whether to enable multicast reception for UEs in RRC_INACTIVE states and core network 130 may provide assistance information to wireless network node 120 to help in this selection. Said assistance information may comprise information about whether UE 110 belongs to a subset of UEs, like to a "privileged" category of a multicast group. If UE 110 belongs to the subset, i.e., is a privileged UE, then wireless network node 120 should ideally not send UE 110 to RRC_INACTIVE state, because UE 110 should have the benefit of being in RRC_CONNECTED state while receiving a multicast service. For example, UE 110 in RRC_CONNECTED state may experience better performance compared to RRC_INACTIVE state as it may provide Hybrid Automatic Repeat Request, HARQ, feedback and Channel State Information, CSI, measurements to wireless network node 120. Wireless network node 120 may then adjust the multicast transmission parameters that would fit the needs of UE 110 and make some HARQ retransmissions, if needed.

One use case of privileged UEs may be public safety. For instance, an application function may provide information about specific public safety participants in group calls (e.g. privilege status, priority). Such information may be used to identify which UEs should be kept in RRC_CONNECTED state and which UEs may be candidates for being transitioned to RRC_INACTIVE or RRC_IDLE state. These privileged UEs may be, e.g., "frequent talkers" that need to stay in RRC_CONNECTED state or simply premium subscribers or high priority UEs.

UEs in a multicast group may be pushed to RRC_INACTIVE state when a multicast service is deactivated, e.g., by wireless network node 120. To activate the session and moving the UEs back to RRC_CONNECTED, a group-paging mechanism may be used, wherein a paging message may comprise a Temporary Mobile Group Identity, TMGI, for the multicast service.

Alternatively, wireless network node 120 may decide to keep the UEs in RRC_INACTIVE state at the time of activating the session and the UEs may receive a multicast service while being in RRC_INACTIVE state. In such a case, wireless network node 120 may perform group paging with an indication, such as a flag, indicating to the UEs in RRC_INACTIVE state to stay in RRC_INACTIVE state, but just get notified about the session activation. Hence, even a privileged UE would stay in the RRC_INACTIVE state to receive the multicast transmission and not initiate a RRC connection to a cell of wireless network node 120, although the privileged UE should ideally always be in the RRC_CONNECTED state.

Example embodiments of the present disclosure therefore make it possible for UE 110 that belongs to the subset, like a privileged UE, to trigger the RRC connection even if UE 110 would be paged with group paging comprising the indication for the UEs to stay in RRC_INACTIVE state to receive the multicast service.

A paging message may comprise a list of identities of a subset of UEs, such as identities of privileged UEs. The paging message may be a radio paging message. The subset may comprise UE 110 and wireless network node 120 may transmit the paging message at the time of activation of a multicast session. UE 110 may hence receive the paging message while it is in the RRC_INACTIVE state. The paging message may comprise a first indication indicating a MBS session to which UE 110 has joined and a second indication indicating to remain in the RRC_INACTIVE state. In some example embodiments, the first indication may be a TMGI of the session and/or the second indication may be a flag for non-privileged UEs to stay in the RRC_INACTIVE state.

In general, the first and second indications may be transmitted in an RRC message. The RRC message may be a RRC release, reconfiguration or setup message. The use of the RRC message, e.g., instead of a NAS message, for indicating the UE behaviour may be beneficial since wireless network node 120 may have more dynamic control of it and additional info (like a validity timer) may be easily added. The RRC message also enables UE-specific indication.

When paging, if wireless network node 120 decides to use RRC_INACTIVE mode multicast reception for the UEs that are not in the subset, i.e., other UEs than the privileged UEs, wireless network node 120 may include the TMGI and the flag for the UEs that are not in the subset. The flag may indicate that the UEs that are not in the subset are to stay in RRC_INACTIVE state and start receiving the multicast service corresponding to the TMGI.

In addition, if UE 110 determines that it belongs to the subset of based on information received in a RRC release message, UE 110 may initiate a resumption of a RRC connection in response to receiving the paging message. Said information received in the RRC release message may comprise for example the list of identities of the subset of UEs, such as identities of privileged UEs. UE 110 may then determine that it belongs to the subset when its identity is in the list and initiate the resumption of the RRC connection. However, if UE 110 determines that it does not belong to the subset, e.g., when its identity is not in the list, UE 110 may remain in the RRC_INACTIVE state. The entries in the list of identities of UEs that belong to the subset may be 5G-S-TMSI, I-RNTI or any other unique identity that UE 110 and wireless network node 120 interpret similarly.

In some example embodiments, the paging message may be transmitted in all paging occasions of all UEs including paging occasions of the UEs in the subset, such as privileged UEs. Alternatively, wireless network node 120 may calculate paging occasions corresponding to the subset of UEs and transmit one or more additional paging messages to the UEs of the subset, to move to the UEs of the subset to RRC_CONNECTED state. In such a case, the paging message transmitted to the UEs of the subset may not comprise the TMGI, but may comprise one or more identities of the UEs that belong to the subset. Moreover, transmission of the paging message comprising the indication for UEs that do not belong to the subset, which are to stay in RRC_INACTIVE state, does not need to consider the paging occasion of the UEs that belong to the subset, since the UEs that belong to the subset are paged separately.

In some example embodiments, if a certain paging occasion for a MBS multicast service is for the UEs that are in the subset, but not for other UEs, wireless network node 120 may page in such occasions by transmitting the first indication indicating the MBS session but not transmitting the second indication indicating to remain in the RRC_INACTIVE state. For example, if the paging occasion comprises only privileged UEs for the given MBS multicast service (identified by a TMGI), the network may page in those occasions with the TMGI without the flag indicating to stay in RRC_INACTIVE. On the other hand, if another paging occasion for the MBS multicast service is for the UEs that are not in the subset, but not for the UEs in the subset, wireless network node 120 may page in those paging occasions by transmitting the first indication and the second indication. For example, if the paging occasion comprises non-privileged UEs, but not privileged UEs, the network may page in those paging occasions with the TMGI and with the flag indicating to stay in RRC_INACTIVE. In such a case, paging with the TMGI along with the flag and paging with I-RNTI may be both needed in paging occasions which are for both, UEs that are in the subset and UEs that are not in the subset, such as privileged and non-privileged UEs, respectively.

In some example embodiments, UE 110 may be allowed to learn that it belongs to the subset, e.g., is a privileged UE. UE 110 may for example learn that it belongs to the subset if it receives both, group paging with the TMGI and RAN paging with I-RNTI in the same paging occasion or within a given time. After learning that it belongs to the subset, UE 110 may later act accordingly, i.e., resume the RRC connection even when receiving group paging with an indication, such as a flag, indicating to stay in the RRC_INACTIVE state. That is, UE 110 may receive both group-paging and dedicated paging in the same slot, and in such a case UE 110 may understand that it belongs to the subset, e.g., is a privileged UE, and behave accordingly in the future if any operation is defined e.g., for CONNECTED privileged UEs.

In some example embodiments, in case of RAN paging wireless network node 120, such as an anchor gNB which moved the UE to the RRC_INACTIVE state from the RRC_CONNECTED state, may transmit to other BSs in an RAN based Notification Area, RNA, a list of UEs in the subset, such as privileged UEs, that joined the multicast service within the RAN paging message. In case of a disaggregated gNB, the list of UEs in the subset may also be transmitted within a F1 paging message from a gNB-Central Unit, CU, to a gNB-Distributed Unit, DU.

In some example embodiments, a UE in the subset may be configured with information that it is indeed in the subset. For instance, a privileged UE may be configured with an information that it is indeed a privileged UE, or at least with information that it may reconnect once receiving paging with an indication indicating UEs that are not in the subset, like non-privileged UEs, to stay in the RRC_INACTIVE state. That is, a UE in the subset may be configured to ignore the indication indicating to stay in the RRC_INACTIVE state. The configuration may be per UE and/or multicast service.

When wireless network node 120 moves UE 110 to the RRC_INACTIVE state from the RRC_CONNECTED state, wireless network node 120 may indicate in the RRC reconfiguration (transmitted in an RRCRelease message) the information that UE 110 belongs to the subset. Alternatively, wireless network node 120 may include in the RRC reconfiguration information configuring UE 110 to ignore, after receiving paging, the indication indicating to stay in the RRC_INACTIVE state. Hence, UE 110 may determine that it belongs to the subset based on said information received in the RRCRelease message and initiate a resumption of the RRC connection.

If UE 110 has received said information when a paging message with an indication that the UEs shall stay in the RRC_INACTIVE state and a TMGI for a service that UE 110 has joined, one option is that UE 110 that received the configuration about being in the subset, like "privileged" configuration, may initiate RRC resume directly. Another option is that there is a third information, in addition to the TMGI and the indication for RRC_INACTIVE UEs to stay in the RRC_INACTIVE, in the paging message. Said third information makes it possible for wireless network node 120 to control specifically whether UEs in the subset, such as privileged UEs, should reconnect or not. If UE 110 that belongs to the subset receives said third information, it may not initiate the resumption of the RRC connection. Otherwise, UE 110 in the subset may initiate the resumption of the RRC connection. A UE that does not belong to the subset, e.g., a UE without such privilege, may stay in the RRC_INACTIVE state in both cases. The use of said third information may be used to introduce more network controlled behavior, whereas direct resumption of the RRC connection would not introduce a new bit in the paging message.

In some example embodiments, the configuration that a UE belongs to the subset, e.g., a UE being "privileged", may be temporary. For example, there may be new "frequent-talkers" in the multicast session after a while, or some other reason where the configuration of the UE that belongs to the subset shall be updated/removed. The network, like wireless network node 120, may not desire to let a UE belong to the subset an indefinite period of time.

Thus, the RRC reconfiguration that moves UE 110 to the RRC_INACTIVE state may also include information about how long UE 110 may consider itself belonging to the subset. A timer may be started once UE 110 goes to the RRC_INACTIVE state and after the expiry of the timer, UE 110 may behave as if it does not belong to the subset anymore. That is, UE 110 may start a timer when it is moved to the RRC_INACTIVE state and determine that it belongs to the subset of user equipments when the timer is running.

In some example embodiments, if UE 110 is in the RRC_INACTIVE state, it may receive the configuration of the multicast service in a camped cell to start/continue receiving a multicast service UE 110 has joined. When a UE in the RRC_INACTIVE state performs cell reselection, it may miss the paging performed at the cell. Also, if such paging is performed periodically by wireless network node 120, UE 110 may need to wait for the next occasion, and waiting would introduce latency. To overcome such problem, a cell may broadcast some information regarding the state of the current session, e.g., whether the UEs may receive the service in the RRC_CONNECTED or in the RRC_INACTIVE state, whether the multicast session is active, etc.

In some example embodiments, a cell may indicate in a System Information Block, SIB, or Multicast Control Channel, MCCH message whether the UEs in the subset may reconnect, or not, for a particular TMGI. For example, the SIB/MCCH information may indicate that the UEs in the RRC_INACTIVE state that do not belong to the subset are to remain in the RRC_INACTIVE state. In some example embodiments, both paging enhancement and SIB/MCCH enhancements may co-exist, where paging may be used for quicker activation of an MBS session and the SIB/MCCH may be used for newcomer UEs of a cell.

In some example embodiments, a cell may also indicate, e.g., over SIB/MCCH, a parameter x representing a percentage of UEs in the subset which may reconnect after receiving a paging message with the indication indicating UEs that do not belong to the subset to stay in the RRC_INACTIVE state. For example, all UEs that belong to the subset in the cell may generate a random number comprised between 1 and 100 and if this random number is less than x for UE 110, then UE 110 may reconnect but otherwise stay in the RRC_INACTIVE state. Hence, UE 110 may determine that it is to initiate resumption of the RRC connection based on the parameter representing a percentage of UEs in the subset that are to initiate said resumption of the RRC connection.

In some example embodiments, the configuration of a UE about belonging to the subset (concerning the handling of the indication indicating UEs that do not belong to the subset to stay inactive) may be received over Non-Access Stratum, NAS. The configuration may be in a NAS Register Accept message or in a NAS Protocol Data Unit, PDU, Session Setup/modification command. Also, update of this configuration from belonging to the subset into not belonging to the subset, or vice versa, may be transmitted over NAS in a UE Configuration Update message or a PDU Session modification command message. For example, update of the configuration from privileged/non-privileged into non-privileged/privileged may be transmitted over NAS in a UE Configuration Update message or a PDU Session modification command message. The configuration information may be received by UE 110 at the time of joining.

Figure 2:
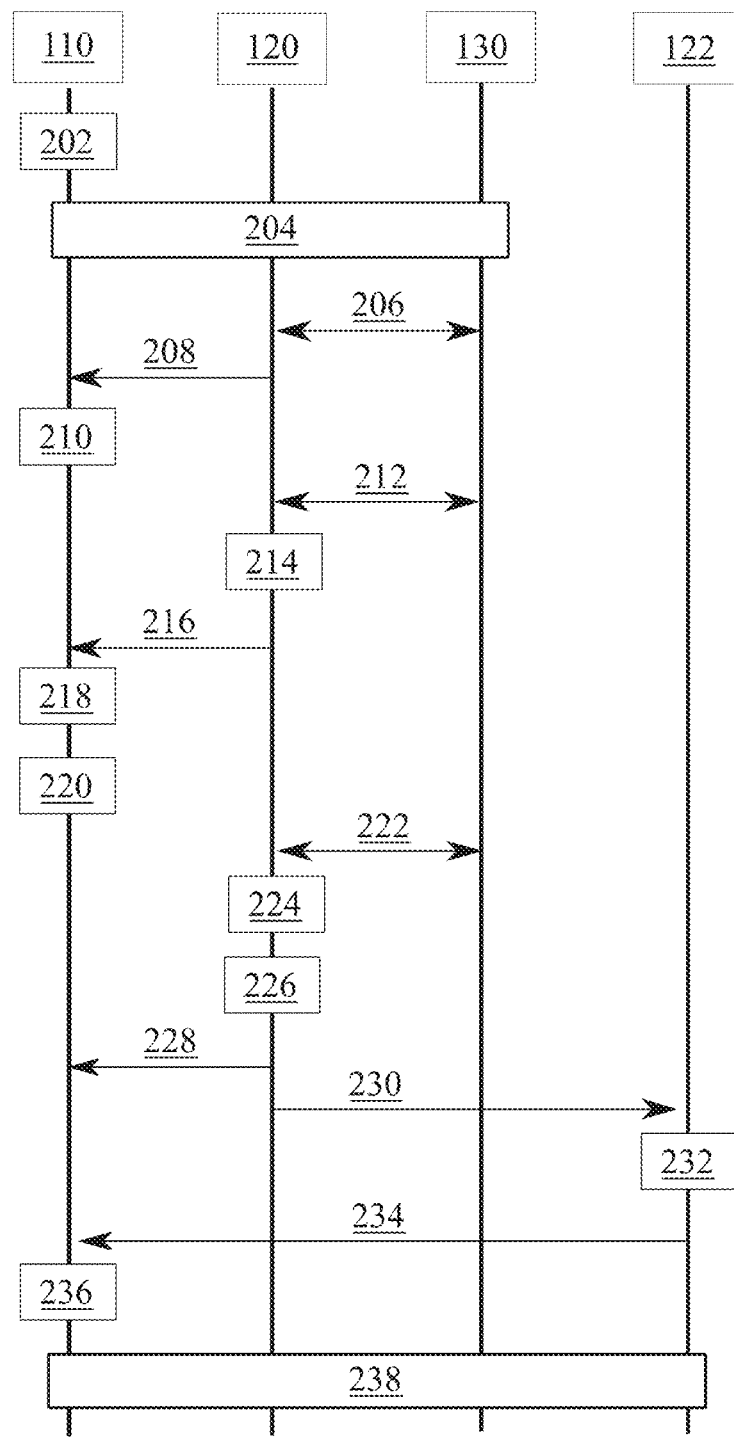
FIG. 2 illustrates a first signalling graph in accordance with at least some example embodiments.

FIG. 2 illustrates a first signaling graph in accordance with at least some example embodiments. On the vertical axes are disposed, from the left to the right, UE 110, wireless network node 120 and core network 130 of FIG. 1. In addition, another wireless network node 122 is shown.

At step 202, UE 110 may be in the RRC_CONNECTED state in a first cell of wireless network node 120, such as a Cell 1 of gNB1. At step 204, UE 110 may join a multicast session identified by TMGI #1 and wireless network node 120 may be configured with the information that the UE belongs to the subset, e.g., is a privileged UE indicated by the 5GC. Multicast session may be deactive, i.e., inactive, there is no data to be transmitted.

At step 206, core network 130, like 5GC, may activate the multicast session. At step 208, wireless network node 120 may configure UE 110 with Multicast Radio Bearers, MRBs, and other needed configurations with RRC signalling to receive the multicast session. At step 210, UE 110 may receive the multicast session from the first cell of wireless network node 120.

At step 212, in a first case the multicast session may be deactivated by core network 130. At step 214, in a second case wireless network node 120 may decide to move UE 110 to the RRC_INACTIVE state as there is no data for the multicast session, i.e., for TMGI #1. At step 216, wireless network node 120 may transmit a RRC release command, possibly comprising an indication indicating that a RNA=Cell 1+Cell 2. At step 218, UE 110 may move to the RRC_INACTIVE state and camp in the first cell. At step 220, UE 110 may continue in the RRC_INACTIVE state and reselect a second cell of another wireless network node 122 (Cell 2 of gNB2) to camp on based on channel conditions.

At step 222, in the first case the multicast session may be activated by core network 130. At step 224, in the second case data for the multicast session (TMGI #1) may arrive to wireless network node 120 from core network 130. At step 226, wireless network node 120 may page during the paging occasions of all UEs, comprising the paging occasions of the UEs in the subset, e.g., privileged UEs.

At step 228, wireless network node 120 may transmit the paging message comprising a first indication indicating the MBS session to which UE 110 has joined and a second indication indicating to remain in the RRC_INACTIVE state. For instance, the paging message may comprise TMGI #1 and a flag for "non-privileged" UEs to stay in RRC_INACTIVE. The paging message may also comprise a list of UEs that belong to the subset, such as a list of privileged UE identities. Wireless network node 120 may not get a response from UE 110 as UE 110 camps under another wireless network node 122.

At step 230, wireless network node 120 may transmit to another wireless network node 122 a RAN paging message comprising the list of UEs that belong to the subset, have joined the session and whose RNA comprises the second cell. At step 232, another wireless network node 122 may page during the paging occasions of all UEs, comprising the paging occasions of the UEs in the subset.

At step 232, another wireless network node 120 may transmit the paging message comprising a first indication indicating the MBS session to which UE 110 has joined and a second indication indicating to remain in the RRC_INACTIVE state. For instance, the paging message may comprise TMGI #1 and a flag for "non-privileged" UEs to stay in RRC_INACTIVE. The paging message may also comprise a list of UEs that belong to the subset, such as a list of privileged UE identities.

At step 236, UE 110 may compare identities in the list of UEs in the subset with its own identity. UE 110 may determine that it belongs to the subset if its own identity is in the list and initiate, at step 238, a resumption of the RRC connection. If the identity of UE 110 is not in the list, UE 110 may determine that it does not belong to the subset and remain in the RRC_INACTIVE state.

Figure 3:
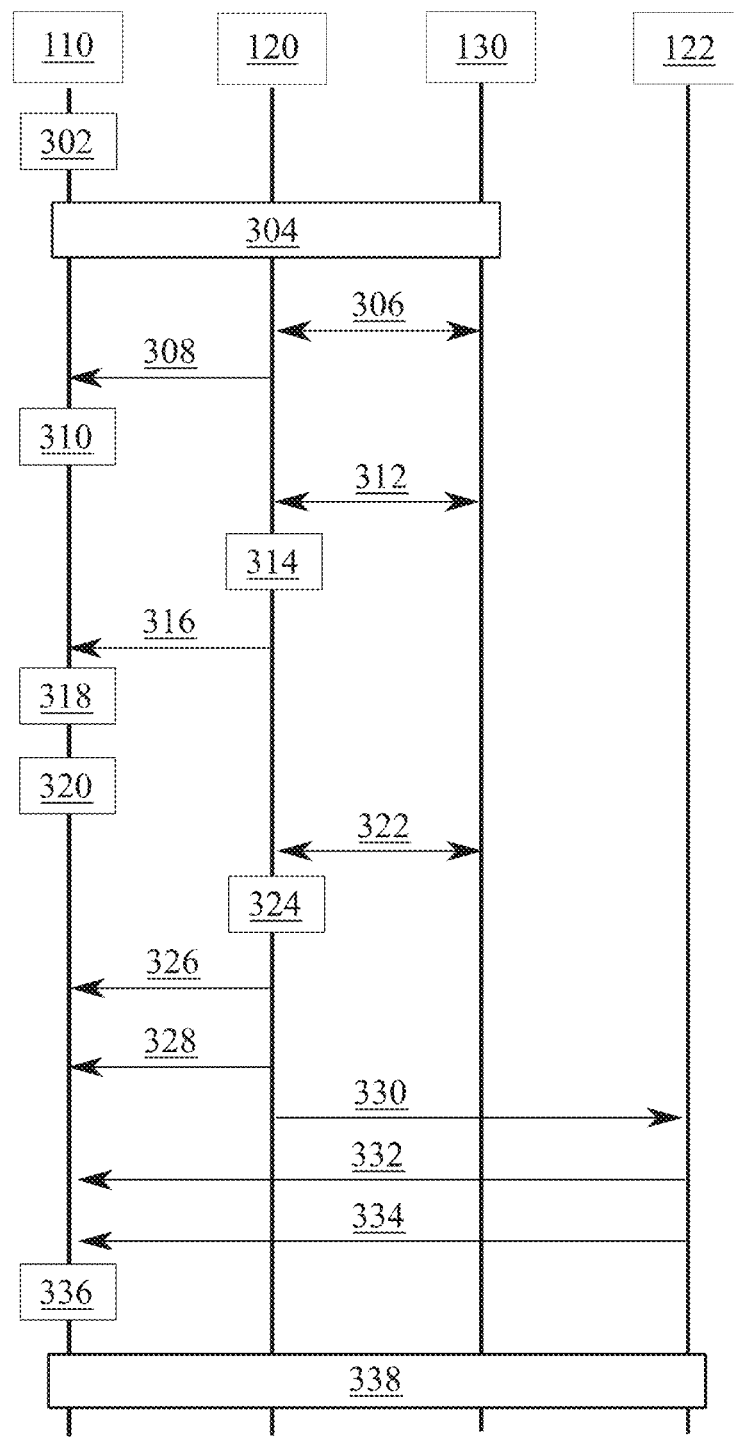
FIG. 3 illustrates a second signalling graph in accordance with at least some example embodiments.

FIG. 3 illustrates a second signaling graph in accordance with at least some example embodiments. On the vertical axes are disposed, from the left to the right, UE 110, wireless network node 120 and core network 130 of FIG. 1. In addition, another wireless network node 122 is shown. Steps 302-324 shown in FIG. 3 may correspond to steps 202-224 shown in FIG. 2, respectively.

At step 326, wireless network node 120 may transmit the paging message comprising a first indication indicating the MBS session to which UE 110 has joined and a second indication indicating to remain in the RRC_INACTIVE state. For instance, the paging message may comprise TMGI #1 and a flag for "non-privileged" UEs to stay in RRC_INACTIVE. The paging message may also comprise a list of UEs that belong to the subset, such as a list of privileged UE IDs. Wireless network node 120 may not get a response from UE 110 as UE 110 camps under another wireless network node 122.

The transmission of the paging message, comprising the second indication indicating the UEs that do not belong to the subset to remain in the RRC_INACTIVE state, might not need to be transmitted considering the paging occasions of the UEs that belong to the subset because those may be paged separately. At step 328, wireless network node 120 may transmit a message comprising the first indication without the second indication, for example if a given paging occasion is for privileged UEs, but not for non-privileged UEs, for the given MBS multicast service. Wireless network node 120 may for example page in those occasions with a TMGI without the flag indicating to stay in RRC_INACTIVE. If a given paging occasion comprises non-privileged UEs, but not privileged UEs, wireless network node 120 may page in those paging occasions with the TMGI and with the flag indicating to stay in RRC_INACTIVE. In some example embodiments, paging with the TMGI with the flag and paging with the I-RNTI may be both needed in paging occasions where there are both privileged and non-privileged UEs.

Wireless network node 120 may not get a response from UE 110 as UE 110 camps under another wireless network node 122. Steps 330-338 shown in FIG. 3 may correspond to steps 230-238 shown in FIG. 2, respectively.

Figure 4:
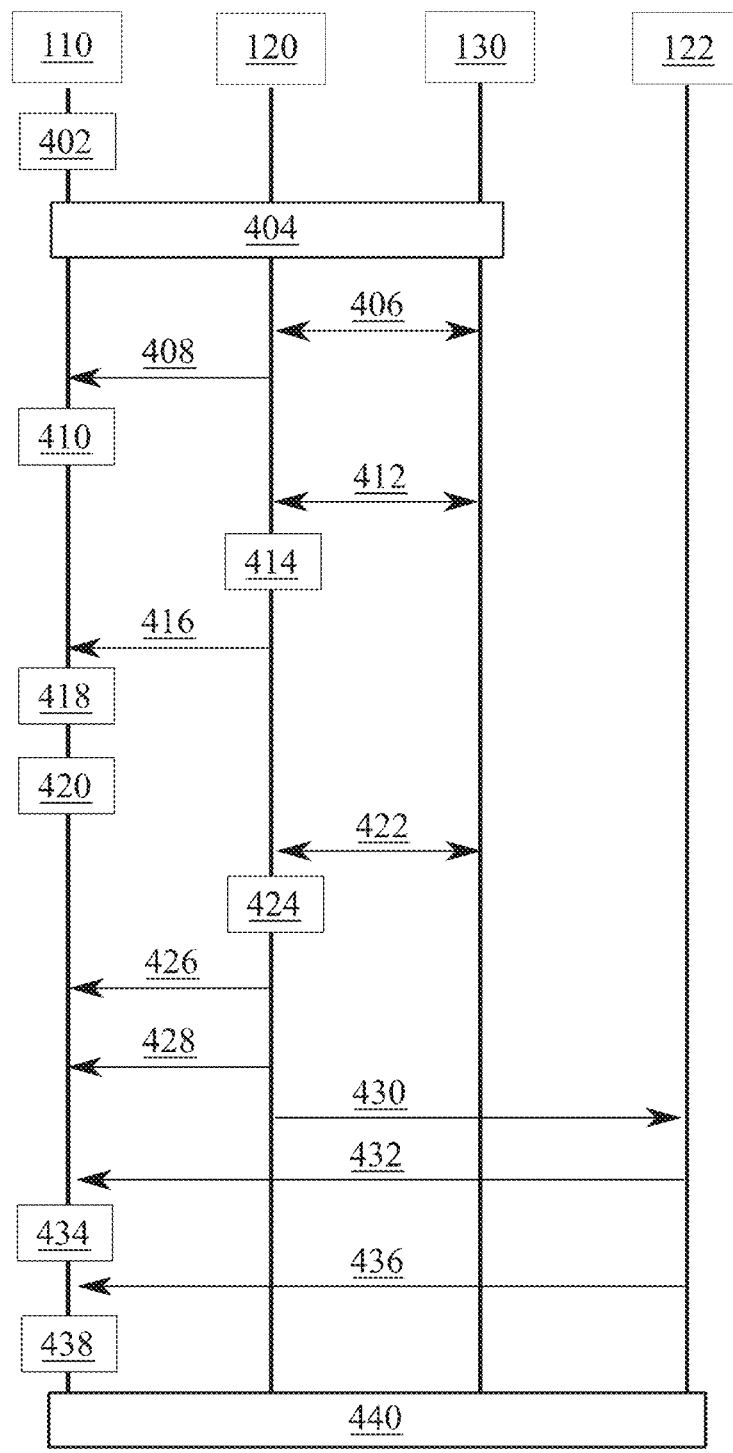
FIG. 4 illustrates a third signalling graph in accordance with at least some example embodiments.

FIG. 4 illustrates a third signaling graph in accordance with at least some example embodiments. On the vertical axes are disposed, from the left to the right, UE 110, wireless network node 120 and core network 130 of FIG. 1. In addition, another wireless network node 122 is shown. Steps 402-424 shown in FIG. 2 may correspond to steps 202-224 shown in FIG. 2, respectively. In addition, at step 404, UE 110 may be configured by wireless network node 120 with information that UE 110 belongs to the subset, e.g., with information that UE 110 is a privileged UE.

Said information may concern handling of the indication indicating UEs to stay in the RRC_INACTIVE state. Said information may be received over NAS, for example a NAS Register Accept message or a NAS PDU Session Setup/modification command. Also, update of this configuration from belonging to the subset to not belonging to the subset, or vice versa, may be transmitted over NAS in a UE Configuration Update message or a PDU Session modification command message. For example, update of the configuration from privileged/non-privileged into non-privileged/privileged may be transmitted over NAS in a UE Configuration Update message or a PDU Session modification command message. The configuration information may be received by UE 110 at the time of joining.

At step 416, UE 110 may also receive a RRC release message from wireless network node 120. The RRC release message may comprise information indicating that UE 110 belongs to the subset, e.g., is a privileged UE. In some example embodiments, another RRC message, such as a RRC reconfiguration or setup message, may be used to configure UE 110 with the "privileged" information, and possibly a timer. Alternatively, the RRC release message may comprise a configuration that UE 110 may, after receiving paging with the second indicating UEs to stay in the RRC_INACTIVE, ignore the second indication and resume the RRC connection. In some example embodiments, the RRC release message may also comprise information about how long UE 110 may consider itself being in the subset, e.g., as a privileged UE. In such a case, UE 110 may, at step 418, start a timer when UE 110 moves to the RRC_INACTIVE state.

Steps 426-430 shown in FIG. 4 may correspond to steps 326-330 shown in FIG. 3 but wireless network node 120 may also, at step 428, transmit an indication indicating the UEs that belong to the subset to resume the RRC connection.

In some example embodiments, another wireless network node 120 may, at step 432, transmit the paging message comprising the first indication indicating the MBS session to which UE 110 has joined and the second indication indicating to remain in the RRC_INACTIVE state. At step 434, UE 110 may check if the timer has expired. If not, UE 110 may resume the RRC connection.

In some example embodiments, another wireless network node 120 may, at step 436, transmit the paging message comprising the first indication indicating the MBS session to which UE 110 has joined and the second indication indicating to remain in the RRC_INACTIVE state. The paging message may also comprise an indication indicating that the UEs in the subset need to resume the RRC connection. At step 438, UE 110 may check if the timer has expired. If not, UE 110 may resume the RRC connection. Step 440 shown in FIG. 4 may correspond to step 338 shown in FIG. 3.

Figure 5:
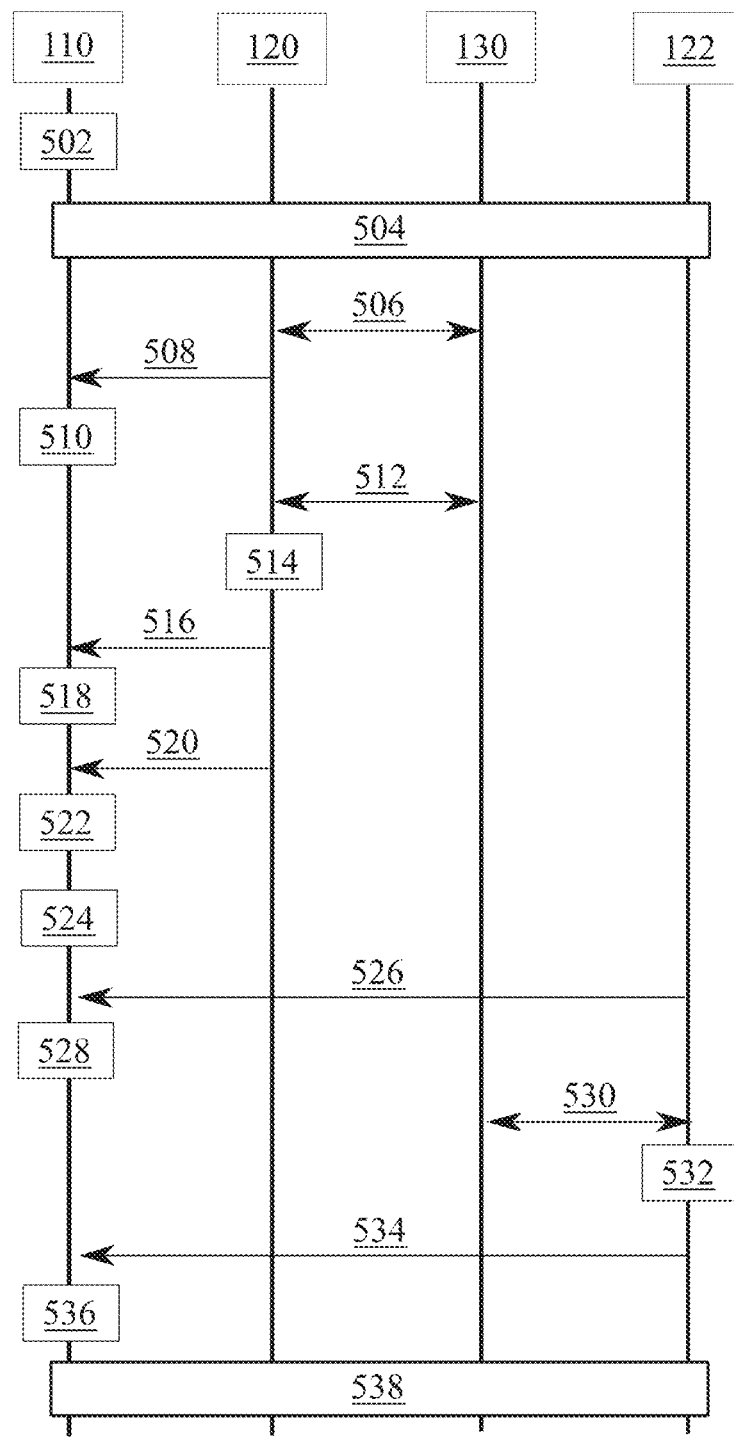
FIG. 5 illustrates a fourth signalling graph in accordance with at least some example embodiments.

FIG. 5 illustrates a fourth signaling graph in accordance with at least some example embodiments. On the vertical axes are disposed, from the left to the right, UE 110, wireless network node 120 and core network 130 of FIG. 1. In addition, another wireless network node 122 is shown. Steps 502-518 shown in FIG. 5 may correspond to steps 202-218 shown in FIG. 2, respectively. In addition, step 516 shown in FIG. 5 may correspond to step 416 shown in FIG. 4.

At step 520, wireless network node 120 may broadcast a message. The message may be broadcasted in SIB/MCCH and comprise an indication that the MBS session, like TMGI #1, is deactive. At step 522, UE 110 may monitor a broadcast channel and wireless network node 120 may broadcast that the MBS session is deactive. UE 110 may for example monitor SIB/MCCH. UE 110 may monitor the broadcast channel for the MBS session(s) and detect, e.g., that TMGI #1 is deactive. UE 110 might not resume the RRC connection in such a case. At step 524, UE 110 may continue in the RRC_INACTIVE state and reselects a second cell to camp on based on channel conditions.

At step 526, UE 110 may monitor a broadcast channel and another wireless network node 122 may broadcast that the MBS session is deactive. At step 528, UE 110 may detect that the MBS session is deactive, e.g., that TMGI #1 is deactive. UE 110 might not resume the RRC connection in such a case. At step 530, the MBS session may be activated. At step 532, another wireless network node 122 may determine data for the MBS session.

At step 534, another wireless network node 122 may broadcast that the MBS session is active. Another wireless network node 122 may for example broadcast in SIB/MCCH that the TMGI #1 is active and a configuration to receive in the RRC_INACTIVE state. Alternatively, or in addition, another wireless network node 122 may broadcast an indication indicating that UE 110 belonging to the subset, such as a privileged UE, need to resume the RRC connection.

At step 536, UE 110 may monitor the broadcast channel, e.g., SIB/MCCH, for the MBS sessions it has joined. UE 110 may determine that it belongs to the subset and initiate, at step 538, a resumption of the RRC connection.

More secure operation may be hence provided, if a list of identities of the UEs that belong to the subset is not exposed. Furthermore, at least some example embodiments may be implemented without any changes in the paging message, at least if the RRC connection is resumed directly. Moreover, in case there would be new features defined in the future for a subset of UEs, like privileged UEs, such UEs may be configured with this information. However, an advantage of the list is the handling of changes from the subset, or to the subset, like "privileged" to "normal/non-privileged", especially if such changes take place frequently. In case of frequent changes, the network may page UE 110 to give a new configuration.

Figure 6:
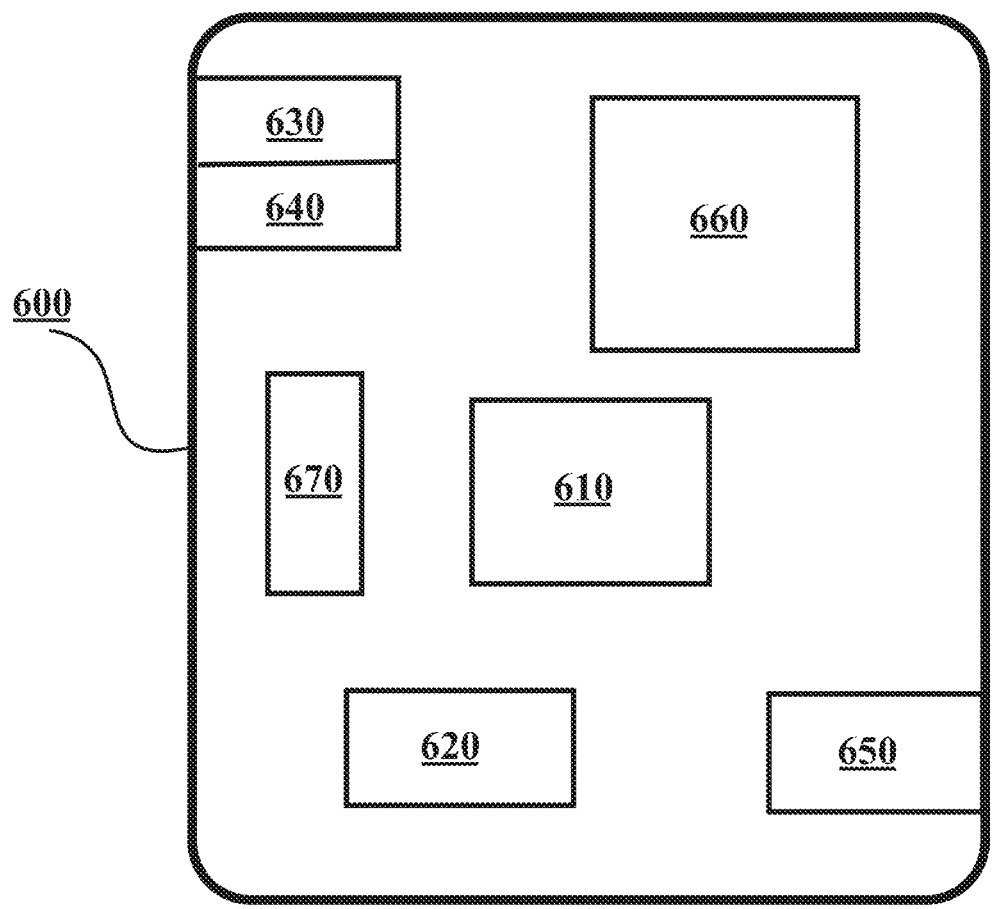
FIG. 6 illustrates an example apparatus capable of supporting at least some example embodiments.

FIG. 6 illustrates an example apparatus capable of supporting at least some example embodiments. Illustrated is device 600, which may comprise, for example, UE 110 or wireless network node 120, or a control device configured to control the functioning thereof, possibly when installed therein. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core produced by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with Global System for Mobile communication, GSM, Wideband Code Division Multiple Access, WCDMA, Long Term Evolution, LTE, and/or 5G/NR standards, for example.

Device 600 may comprise a Near-Field Communication, NFC, transceiver 650. NFC transceiver 650 may support at least one NFC technology, such as Bluetooth, Wibree or similar technologies.

Device 600 may comprise User Interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a Subscriber Identity Module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some example embodiments, device 600 lacks at least one device described above. For example, some devices 600 may lack a NFC transceiver 650 and/or user identity module 670.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the example embodiment, various ways of interconnecting at least two of the aforementioned devices may be selected without departing from the scope of the example embodiments.

FIG. 7 is a flow graph of a first method in accordance with at least some example embodiments. The apparatus of the first method may be UE 110 or a control device configured to control the functioning thereof, possibly when installed therein. That is, the steps of the first method may be performed by UE 110 or by a control device configured to control the functioning thereof, possibly when installed therein.

The first method may comprise, at step 710, receiving, by an apparatus, a message while the apparatus is in a radio resource control inactive state, wherein the message comprises a first indication indicating a multicast-broadcast service session to which the apparatus has joined and a second indication indicating to remain in the radio resource control inactive state. The first method may also comprise, at step 720, and in response to receiving the message: in case determining by the apparatus based at least on information received in a radio resource control message that the apparatus belongs to a subset of user equipments, initiating a resumption of a radio resource control connection, and in case not determining by the apparatus that the apparatus belongs to the subset, remaining in the radio resource control inactive state.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, UE 110 or wireless network node 120, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, UE 110 or wireless network node 120, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in cellular communication networks, such as 5G networks, and possibly in other cellular communication networks in the future as well.

ACRONYMS LIST

3GPP 3rd Generation Partnership Project
5G-S-TMSI 5G Serving Temporary Mobile Subscriber Identity
BS Base Station
CN Core Network
CSI Channel State Information
CL Central Unit
DU Distributed Unit
GSM Global System for Mobile communication
HARQ Hybrid Automatic Repeat Request
IoT Internet of Things
I-RNTI Inactive Radio Network Temporary Identifier
LTE Long-Term Evolution
M2M Machine-to-Machine
MBS Multicast and Broadcast Services
MRB Multicast Radio Bearers
MCCH Multicast Control Channel
NAS Non-Access Stratum
NFC Near-Field Communication
NR New Radio
P-RNTI Paging Radio Network Temporary Identifier
PCCH Paging Control Channel
PDCCH Physical Downlink Control Channel
PDU Protocol Data Unit
PTM Point to Multipoint
RAN Radio Access Network
RAT Radio Access Technology
RNA RAN based Notification Area
RRC Radio Resource Control
SIB System Information Block
TMGI Temporary Mobile Group Identity
TRP Transmission and Reception Point
UE User Equipment UI User Interface
WCDMA Wideband Code Division Multiple Access
WiMAX Worldwide Interoperability for Microwave Access
WLAN Wireless Local Area Network

REFERENCE SIGNS LIST

| | |
|---|---|
| 110 | UE |
| 112, 114 | Beams |
| 115, 125, 135 | Interfaces |
| 120, 122 | BS |
| 130 | Core network |
| 202-238 | Steps in the signalling graph of FIG. 2 |
| 302-338 | Steps in the signalling graph of FIG. 3 |
| 402-440 | Steps in the signalling graph of FIG. 4 |
| 502-538 | Steps in the signalling graph of FIG. 5 |
| 600-670 | Structure of the apparatus of FIG. 6 |
| 710-730 | Phases of the method in FIG. 7 |

The invention claimed is:

1. An apparatus comprising at least one processor; and at least one memory including computer program code; the at least one memory and the computer program code configured to, with the at least one processor, cause the apparatus at least to:
receive, by the apparatus, a paging message while the apparatus is in a radio resource control inactive state, wherein the paging message comprises a first indication indicating a multicast-broadcast service session to which the apparatus has joined and a second indication indicating to remain in the radio resource control inactive state;
and in response to receiving the paging message: in case determining by the apparatus based at least on information received in a radio resource control message that the apparatus belongs to a subset of user equipments, initiate a resumption of a radio resource control connection, and in case not determining by the apparatus that the apparatus belongs to the subset, remain in the radio resource control inactive state.

2. The apparatus according to claim 1, wherein the subset of user equipments comprises privileged user equipments.

3. The apparatus according to claim 1, wherein the at least one memory and the computer program code are further configured to, with the at least one processing core, cause the apparatus at least to:
receive the radio resource control message, wherein the radio resource control message comprises a configuration indicating that the apparatus belongs to the subset of user equipments.

4. The apparatus according to claim 1, wherein the paging message is received during a paging occasion; and
the apparatus is determined to belong to the subset when the paging occasion is a paging occasion of the subset of user equipments.

5. The apparatus according to claim 1, wherein the apparatus is determined to belong to the subset when the apparatus is configured as a privileged user equipment.

6. The apparatus according to claim 1, wherein the paging message further comprises an indication indicating whether user equipments belonging to the subset are to initiate said resumption of the radio resource control connection responsive to reception of the paging message.

7. The apparatus according to claim 1, wherein the at least one memory and the computer program code are further configured to, with the at least one processing core, cause the apparatus at least to:
determine that the apparatus is to initiate said resumption of the radio resource control connection based on a parameter representing a percentage or fraction of user equipments in the subset that are to initiate said resumption of the radio resource control connection.

8. The apparatus according to claim 7, wherein the at least one memory and the computer program code are further configured to, with the at least one processing core, cause the apparatus at least to:
receive the parameter in a broadcast message or a paging message.

9. The apparatus according to claim 1, wherein the at least one memory and the computer program code are further configured to, with the at least one processing core, cause the apparatus at least to:
ignore the second indication in case it is determined that the apparatus belongs to the subset of user equipments.

10. The apparatus according to claim 1, wherein the at least one memory and the computer program code are further configured to, with the at least one processing core, cause the apparatus at least to:
start a timer when the apparatus is moved to the radio resource control inactive state; and
wherein the determining that the apparatus belongs to a subset of user equipments is performed when the timer is running.

11. The apparatus according to claim 1, wherein the radio resource control message is a radio resource control release, reconfiguration or setup message.

12. The apparatus according to claim 1, wherein the apparatus is a user equipment or a control device configured to control functioning of the user equipment.

13. A method, comprising:
receiving, by an apparatus, a paging message while the apparatus is in a radio resource control inactive state, wherein the paging message comprises a first indication indicating a multicast-broadcast service session to which the apparatus has joined and a second indication indicating to remain in the radio resource control inactive state;
and in response to receiving the paging message: in case determining by the apparatus based at least on information received in a radio resource control message that the apparatus belongs to a subset of user equipments, initiating a resumption of a radio resource control connection, and in case not determining by the apparatus that the apparatus belongs to the subset, remaining in the radio resource control inactive state.

14. An apparatus comprising at least one processor; and at least one memory including computer program code; the at least one memory and the computer program code configured to, with the at least one processor, cause the apparatus at least to:
transmit a paging message to at least one user equipment while the at least one user equipment is in a radio resource control inactive state, wherein the paging message comprises a first indication indicating a multicast-broadcast service session to which the at least one user equipment has joined and a second indication indicating to remain in the radio resource control inactive state; and
transmit to a neighbour wireless network node an indication indicating a subset of user equipments, wherein the user equipments in the subset are to initiate a resumption of a radio resource control connection responsive to receiving the paging message.

15. The apparatus according to claim 14, wherein the indication is transmitted to the neighbour wireless network when releasing the at least one user equipment to the radio resource control inactive state or when performing radio access network paging.

16. A method, comprising:
    transmitting, by an apparatus, a paging message to at least one user equipment while the at least one user equipment is in a radio resource control inactive state, wherein the paging message comprises a first indication indicating a multicast-broadcast service session to which the at least one user equipment has joined and a second indication indicating to remain in the radio resource control inactive state; and
    transmitting, by the apparatus, to a neighbour wireless network node an indication indicating a subset of user equipments, wherein the user equipments in the subset are to initiate a resumption of a radio resource control connection responsive to receiving the paging message.

* * * * *